(12) United States Patent
Kim

(10) Patent No.: US 10,810,948 B2
(45) Date of Patent: Oct. 20, 2020

(54) DISPLAY APPARATUS AND CONTROL METHOD THEREOF

(71) Applicant: Samsung Electronics Co., Ltd., Suwon-si, Gyeonggi-do (KR)

(72) Inventor: Kyoungwook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/401,759

(22) Filed: May 2, 2019

(65) Prior Publication Data

US 2019/0340982 A1    Nov. 7, 2019

(30) Foreign Application Priority Data

May 3, 2018   (KR) .................. 10-2018-0050978

(51) Int. Cl.
```
G09G 3/34       (2006.01)
G02F 1/13357    (2006.01)
H05B 47/11      (2020.01)
H05B 47/16      (2020.01)
```

(52) U.S. Cl.
CPC ..... *G09G 3/3406* (2013.01); *G02F 1/133611* (2013.01); *H05B 47/11* (2020.01); *H05B 47/16* (2020.01); *G09G 2320/0653* (2013.01); *G09G 2360/144* (2013.01)

(58) Field of Classification Search
CPC ........ G02F 1/133611; G09G 2300/026; G09G 2320/0626; G09G 2320/0653; G09G 2330/021; G09G 2360/144; G09G 2360/145; G09G 3/2007; G09G 3/3406; G09G 5/10; H05B 47/11; H05B 47/16

USPC .................................................. 345/102, 690
See application file for complete search history.

(56) References Cited

U.S. PATENT DOCUMENTS

| | | | |
|---|---|---|---|
| 2012/0299980 A1* | 11/2012 | Fujikawa | G06F 3/1431 345/690 |
| 2013/0175934 A1* | 7/2013 | Fujita | H05B 45/46 315/186 |
| 2013/0257706 A1* | 10/2013 | Tsai | G09G 3/3426 345/102 |
| 2014/0368420 A1* | 12/2014 | Nishio | G09G 3/3406 345/102 |
| 2017/0332455 A1* | 11/2017 | Ondrisek | H05B 47/11 |
| 2017/0337868 A1 | 11/2017 | Drzaic | |
| 2017/0337882 A1* | 11/2017 | Niioka | G09G 3/3611 |
| 2017/0351118 A1 | 12/2017 | Barrau et al. | |
| 2017/0366798 A1 | 12/2017 | Bae et al. | |

* cited by examiner

*Primary Examiner* — Tony O Davis
(74) *Attorney, Agent, or Firm* — Staas & Halsey LLP

(57) ABSTRACT

A display apparatus and a method of controlling the display apparatus are provided. The display apparatus includes a display comprising a liquid crystal layer, and a backlight unit that outputs light toward the liquid crystal layer; an illuminance sensor provided at one side of the display and that measures illuminance; and a processor that configured to determine output brightness of the display based on a difference between illuminance measured by the illuminance sensor when the backlight unit is turned on and illuminance measured by the illuminance sensor when the backlight unit is turned off, and control intensity of light output from the backlight unit to be adjusted corresponding to the difference.

20 Claims, 10 Drawing Sheets

DISPLAY APPARATUS AND CONTROL METHOD THEREOF

CROSS-REFERENCE TO RELATED THE APPLICATION

This application is based on and claims priority under 35 U.S.C. § 119 to Korean Patent Application No. 10-2018-0050978 filed on May 3, 2018 in the Korean Intellectual Property Office, the disclosure of which is incorporated by reference herein in its entirety.

BACKGROUND

Field

Apparatuses and methods consistent with the exemplary embodiments relate to a display apparatus and a control method thereof, and more particularly to a display apparatus for measuring brightness of a display and a control method thereof.

Description of the Related Art

With recent development of a display with high brightness, an outdoor advertising display has been widely spread. The outdoor advertising display may be for example a digital signage product, downloads advertising content from a server, and reproduces the advertising content on preset schedule.

The outdoor advertising display consumes relatively much power as compared with a general display, and is thus required to reduce power consumption.

As the most common method of reducing the power consumption, there has been used a method of measuring the ambient light of the outdoor advertising display and decrease the brightness of the display in a dark condition.

However, a sensing direction of an illuminance sensor provided in the display is generally oriented not toward the display but outward. Therefore, the illuminance sensor can hardly accurately measure the brightness of the display, but just measures the brightness of surrounding environments.

Further, the display cannot maintain constant brightness since its brightness is gradually decreased in proportion to use time.

Meanwhile, a digital signage product is required to have a proof-of-play (POP) function for monitoring whether scheduled advertising content is normally reproduced in the display.

SUMMARY

According to an aspect of the disclosure, there is a display apparatus comprising: a display comprising a liquid crystal layer, and a backlight unit configured to output light toward the liquid crystal layer; an illuminance sensor provided at one side of the display and configured to measure illuminance; and a processor configured to determine output brightness of the display based on a difference between illuminance measured by the illuminance sensor when the backlight unit is turned on and illuminance measured by the illuminance sensor when the backlight unit is turned off, and control intensity of light output from the backlight unit to be adjusted corresponding to the difference. The display apparatus further comprises glass provided on a front of the display, wherein the processor calculates the output brightness of the display by excluding external light coming through the glass from the measured illuminance.

The illuminance sensor may be provided to have a sensing direction oriented toward a space between the glass and the display.

The processor may determine the output brightness of the display on a preset cycle, and monitors a decrease of the determined output brightness.

The display apparatus further comprises a storage, wherein the processor stores reference brightness in the storage, and adjusts intensity of light output from the backlight unit to correspond to the reference brightness when the determined output brightness is lower than the reference brightness.

The measured illuminance when the backlight unit is off is first illuminance and the measured illuminance when the backlight unit is on is second illuminance, and the processor may determine the output brightness of the display based on the difference between the first illuminance and the second illuminance.

The illuminance sensor may be placed in a bezel region of the display apparatus.

The sensing direction of the illuminance sensor may be changeable.

The processor may set the display to operate with a first maximum value lower than a limit value for the output brightness of the backlight unit, and increases the output brightness from the first maximum value to a second maximum value when the output brightness is decreased.

According to another aspect of the disclosure there is provided a display apparatus comprising: a display comprising a liquid crystal layer, and a backlight unit configured to output light toward the liquid crystal layer; a communicator configured to communicate with an electronic device; and a processor configured to control the communicator to receive information about first illuminance measured when the backlight unit is turned off, from the electronic device and second illuminance measured when the backlight unit is turned on, from the electronic device, determine output brightness of the display based on a difference between the first illuminance and the second illuminance, and control intensity of light output from the backlight unit to be adjusted corresponding to the difference.

The communicator receives the information from The electronic device including an illuminance sensor or a camera to measure illuminance.

According to another aspect of the disclosure there is provided a computer program product comprising: a memory configured to store a plurality of instructions; and a processor, wherein the instruction is executed by the processor to determine output brightness of a display based on a difference between illuminance measured by an illuminance sensor provided at one side of the display when the backlight unit is turned on and illuminance measured when the backlight unit is turned off, and control intensity of light output from the backlight unit to be adjusted corresponding to the difference. According to another aspect of the disclosure there is provided a method of controlling a display apparatus, the method comprising: measuring illuminance by an illuminance sensor provided at one side of a display that comprises a liquid crystal layer, and a backlight unit configured to output light toward the liquid crystal layer; determining output brightness of the display based on a difference between illuminance measured by the illuminance sensor when the backlight unit is turned on and illuminance measured by the illuminance sensor when the backlight unit is turned off; and controlling intensity of light output from the backlight unit to be adjusted corresponding to the difference. The determination of the output brightness may comprise determining the output brightness of the display by excluding external light coming through glass provided on a front of the display from the measured illuminance.

The illuminance sensor may be provided to have a sensing direction oriented toward a space between the glass and the display.

The method further comprises: determining the output brightness of the display on a preset cycle; and monitoring a decrease of the determined output brightness.

The method further comprises: storing reference brightness; and adjusting intensity of light output from the backlight unit to correspond to the reference brightness when the determined output brightness is lower than the reference brightness.

The measured illuminance when the backlight unit is off is first illuminance and the measured illuminance when the backlight unit is on is second illuminance, the method further comprises determining the output brightness of the display based on difference between first illuminance and the second illuminance measured.

According to another aspect of the disclosure there is provided a method of controlling a display apparatus, the method comprising: communicating with an electronic device; receiving information about first illuminance measured when the backlight unit is turned off, from the electronic device and second illuminance measured when the backlight unit is turned on, from the electronic device; determining output brightness of the display based on a difference between the first illuminance and the second illuminance; and controlling intensity of light output from the backlight unit to be adjusted corresponding to in the difference.

The receiving information of the information further comprises receiving the information from the electronic device including an illuminance sensor or a camera to measure illuminance.

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Below, embodiments of the disclosure will be described in detail with reference to accompanying drawings so as to be easily understood by a person having an ordinary skill in the art to which the disclosure pertains. The disclosure may be embodied in various forms and not limited to the embodiments set forth herein.

Figure 1:
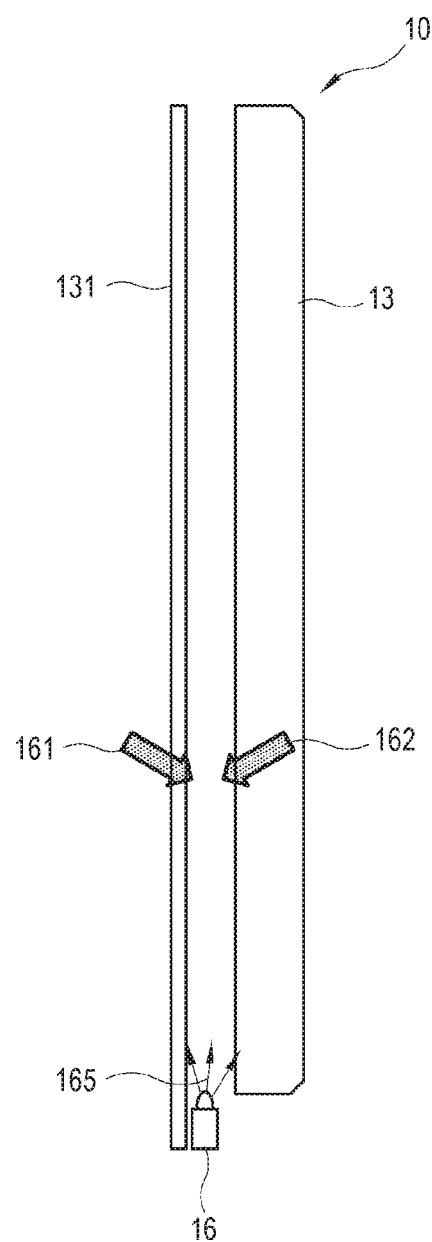
FIG. 1 illustrates an example that an illuminance sensor is provided between glass and a display according to an embodiment of the disclosure.

FIG. 1 illustrates an example that an illuminance sensor is provided between glass and a display according to an embodiment of the disclosure. As shown in FIG. 1, a display apparatus 10 of the disclosure includes a display 13, and an illuminance sensor 16 provided at one side of the display 13 and measuring the illuminance.

In the front of the display 13, an additional element may be further provided to protect the display 13. The illustrated example additionally includes glass 131 in the front of the display 13. The glass 131 is provided as a kind of material installable on the front of the display 13, but there are no limits to this material. Alternatively, the display 13 may have a configuration including other materials.

In this embodiment, the sensing direction of the illuminance sensor 16 is oriented toward a space between the display 13 and the glass 131. The illuminance sensor 16 senses both external light 161 including, for example, sunlight, etc. coming through the glass 131 and panel light 162 output from the display 13.

The display apparatus 10 of the disclosure calculates the output brightness of the display 13 based on an illuminance value measured by the illuminance sensor 16, in order to monitor whether the brightness of the display 13 is decreased according to use time.

The display apparatus 10 determines a decrease degree of the output brightness of the display 13 calculated as above, and performs an operation to make up for the decrease degree.

Figure 2:
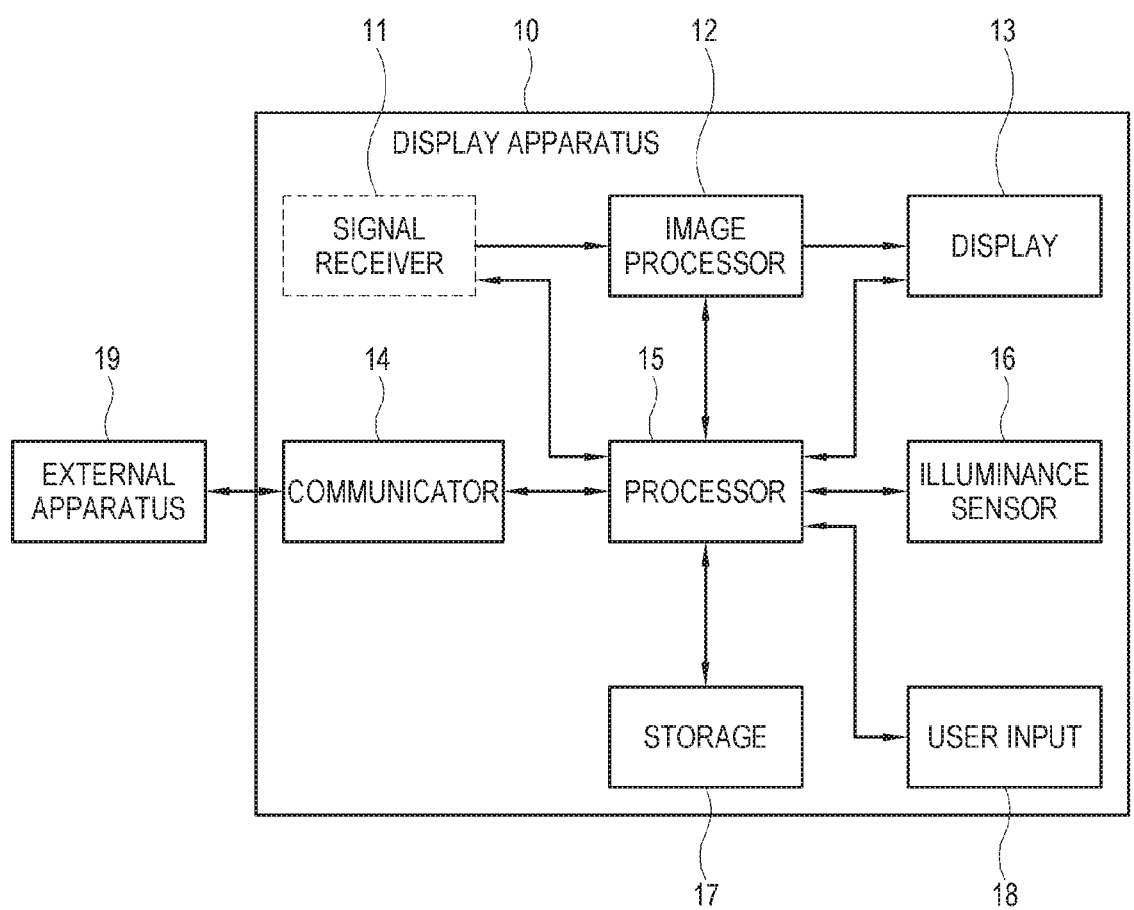
FIG. 2 is a block diagram showing a configuration of a display apparatus according to an embodiment of the disclosure.

FIG. 2 is a block diagram showing a configuration of a display apparatus shown in FIG. 1. As shown in FIG. 2, the display apparatus 10 of the disclosure includes an image processor 12, a display 13, a communicator 14, a processor 15, an illuminance sensor 16, a storage 17, and a user input 18, and may further include a signal receiver 11. The display apparatus 10 of the disclosure is not limited to this configuration described above according to an embodiment, but may exclude some elements or additionally include some other elements.

The display apparatus 10 may, for example, be a large format display (LFD) apparatus used as an advertising electronic signage, an exhibition display, etc. The display apparatus 10 is not limited to the LFD apparatus for advertising and exhibition purposes, but may be applied to any of various digital signage products configured to reproduce content having various formats based on schedules. For example, the display apparatus 10 may be, for example, a video wall configured with a plurality of display modules. Further, the display apparatus 10 of the disclosure may be, for example, a general display product such as a television (TV), a personal computer (PC), etc.

According to an embodiment, when the display apparatus 10 is, for example, the digital signage product, the elements other than the display 13 and the illuminance sensor 16, i.e. the processor 15, the communicator 14, the signal receiver 11, the image processor 12, the storage 17, the user input 18, etc. may be, for example, a separate computing system.

The display apparatus 10 communicates with an external apparatus 19 through the communicator 14 using a wired or wireless communication method, and receives schedule information and a plurality of pieces of content from the external apparatus 19. The plurality of pieces of content includes various kinds of content such as a moving image, a still image, a documentary file, a text file, etc.

The external apparatus 19 may be, for example, a server that stores the plurality of pieces of content and provides the content to at least one display apparatus 10 in accordance with schedules set in the schedule information. Further, the external apparatus 19 may be, for example, individual servers, one of which distributes the schedule information while the other provides the content.

The display apparatus 10 downloads the content from the external apparatus 19 based on the schedule information received from the external apparatus 19, and reproduces the completely downloaded content on present schedule.

The communicator 14 uses a wired or wireless communication method to communicate with the external apparatus 19. To communicate with the external apparatus 19, the communicator 14 may employ Ethernet or the like wired communication method, or Wi-Fi, Bluetooth or the like wireless communication method. For example, the communicator 14 may be provided as a printed circuit board (PCB) including a module for Wi-Fi or the like wireless communication module. However, there are no limits to the communication method of the communicator 14. Alternatively, the communicator 14 may employ another communication method to communicate with the external apparatus 19.

The signal receiver 11 may receive an image signal of content from the outside, and the image signal may for example include a video or graphic signal. The signal receiver 11 may be provided in various forms according to formats of image and broadcast signals to be received and the types of the display apparatus 10. For example, the signal receiver 11 may be, for example, a tuner for receiving a radio frequency (RF) broadcast or satellite signal transmitted from a broadcasting station.

The image processor 12 performs a preset signal processing process with regard to an image or broadcast signal received in the signal receiver 11. Further, the image processor 12 may perform the preset signal processing process with regard to an image signal of content received from the external apparatus 19 through the communicator 14. As an example of the signal process performed in the image processor 12, there are demultiplexing, decoding, de-interlacing, scaling, noise reduction, detail enhancement, etc. without limitations. The image processor 12 may be, for example, a system on chip (SoC) where many functions corresponding to such processes are integrated or an image processing board where individual parts for independently performing the processes are mounted.

The display 13 displays an image based on an image or broadcast signal processed in the image processor 12. The display 13 includes a liquid crystal layer (not shown), and a backlight unit (not shown) for outputting light toward the liquid crystal layer. The display 13 may be variously, for example, a plasma display panel (PDP), a liquid crystal display (LCD), an organic light emitting diode (OLED), a flexible display, etc. without limitations.

The illuminance sensor 16 refers to a sensor that measures the brightness, i.e. illuminance of a space within a range, and measures a value obtained by dividing luminous flux projected onto a certain surface by the area of the surface. The illuminance is represented in units of lux, which is in proportion to intensity of a light source but in inverse proportion to a distance from the light source. The illuminance sensor may for example employ various photocells, photoelectric tubes, etc.

The illuminance sensor 16 of the disclosure is installed at one side of the display 13 and measures the illuminance. According to an embodiment, when the glass 131 is provided on the front of the display 13, the illuminance sensor 16 may be installed in a space between the display 13 and the glass 131. Further, the illuminance sensor 16 may be installed in such a manner that a lens protrudes from a region of a bezel positioned in the lower end of the space between the display 13 and the glass 131.

The illuminance sensor 16 can simultaneously sense both the external light 161 coming through the glass 131 and the panel light 162 output from the display 13 at the position installed as described above. In this case, the illuminance sensor 16 senses the external light 162 and the panel light 162 while having directionality of a small range within 180 degrees.

According to an embodiment, the illuminance sensor 16 may be provided to have a changeable sensing direction. That is, the illuminance sensor 16 may change its sensing direction toward the glass 131 or the display 13. In this case, the illuminance sensor 16 may individually sense the external light 161 or the panel light 162 while changing the sensing direction.

The user input unit 18 receives a user's input for controlling at least one function of the display apparatus 10. For example, the user input unit 18 may receive a user's input for selecting a portion of a user interface displayed on the display 13. The user input unit 18 may be, for example, in the form of an input panel provided on an outer side of the display apparatus 10 or a remote controller communicating with the display apparatus 10 by an infrared method. Further, the user input unit 18 may be, for example, a keyboard, a mouse, and the like connected to the display apparatus 10, and may also be, for example, a touch screen provided on the display apparatus 10.

According to an embodiment, the user input unit 18 may receive a user's input from a mobile device (not shown) that communicates with the display apparatus 10 by Wi-Fi, Bluetooth, or an infrared communication method. In this case, the mobile device may be provided as a smart phone or the like, and may for example be installed with a remote-control application and transmit a user's input to the display apparatus 10 when the remote-control application is executed and a button touch or the like is made to control an operation of the display apparatus 10.

The storage 17 includes a first memory (not shown) and a second memory (not shown). The first memory is, for example, a nonvolatile memory such as a flash memory to retain data regardless of whether the system of the display apparatus 10 is powered on or off.

The first memory is configured to store a plurality of executable instructions for at least one program. The first memory may perform reading, writing, editing, deleting, updating, etc. with regard to each of the plurality of stored instructions.

The second memory refers to a high-speed buffer memory provided between the first memory and the processor 15, and is called a cache memory or a local memory. The second memory is faster than the flash memory and is directly accessible by the processor 15. The second memory refers to a region, in which the plurality of instructions of the program or data frequently accessed by the processor 15 is stored to be instantaneously usable without repetitive retrieval, and may be, for example, a random access memory (RAM). According to an embodiment, the second memory may for example be integrated into the processor 15.

The processor 15 performs a control process for controlling a plurality of functions that the display apparatus 10 can implement. The processor 15 may be, for example, a central processing unit (CPU), and include three areas for control, operation and register. In the control area, the plurality of instructions stored in the first memory is analyzed, and the elements of the display apparatus 10 are controlled according to the analyzed instructions. In the operation area, an arithmetic operation and a logical operation are performed, and operations needed for controlling the elements of the display apparatus 10 are carried out according to the instructions from the control area. The register area refers to a memory place for storing pieces of information needed while the CPU executes the plurality of instructions, and is configured to store the instructions and data for the elements of the display apparatus 10 and the results of the operations.

The processor 15 executes a plurality of instructions of at least one program stored in the first memory and the second memory. For example, the processor 15 may execute the operating system of the display apparatus 10, security programs of digital rights management (DRM), a conditional access system (CAS), etc., a client application, a web-based application, an application for Internet communication, etc.

According to an embodiment, the processor 15 may download and execute an instruction stored in a separate computer program product (not shown). According to an embodiment, the computer program product includes a memory, in which instructions are stored, and a processor. Here, the instruction may be issued to calculate the output brightness of the display 13 by excluding an external light component from the illuminance measured by the illuminance sensor 16 installed at one side of the display 13, and adjust intensity of light output from the backlight unit of the display 13 in response to decrease in the calculated output brightness of the display 13, when executed by the processor 15.

Figure 3:
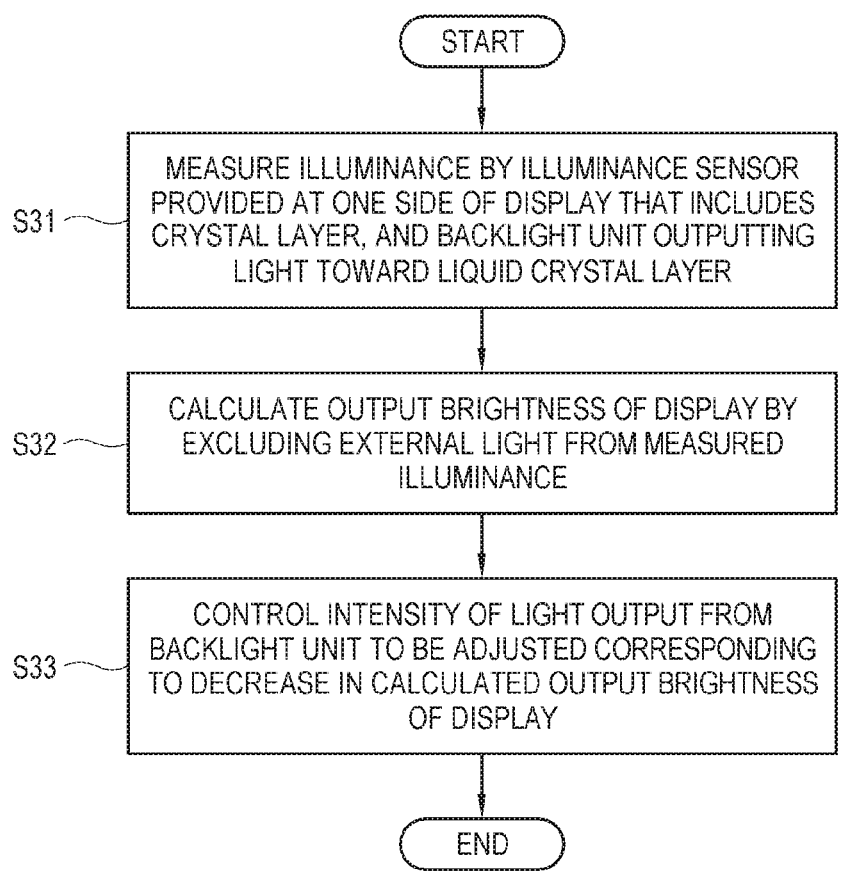
FIG. 3 is a flowchart showing a control method of a display apparatus according to an embodiment of the disclosure.

According to an embodiment of the disclosure, the operations of the processor 15 may be illustrated like the flowchart shown in FIG. 3.

First, at operation S31, the processor 15 measures the illuminance through the illuminance sensor 16 installed at one side of the display 13. Here, the display 13 includes a liquid crystal layer (not shown), and a backlight unit (not shown) emitting light toward the liquid crystal layer, and the illuminance sensor 16 senses both the panel light 162 emitted from the backlight unit, and the external light 1 such as sunlight, etc.

Next, at operation S32, the processor 15 calculates the output brightness of the display 13 by excluding the component of the external light 161 from the illuminance measured using the illuminance sensor 16.

According to an embodiment, when the illuminance sensor 16 senses the space between the glass 131 and the display 13 in the operation S32, the processor 15 excludes the component of the external light 161 coming through the glass 131 to thereby calculate the output brightness of the display 13.

According to an embodiment, in the operation S32 the processor 15 may perform an operation of calculating the output brightness of the display 13 on a preset cycle, and an operation of monitoring a decrease degree of the calculated output brightness. Thus, it is possible to digitize the decrease degree of the brightness by measuring how much the brightness of the display 13 is decreased according to use time.

Last, at operation S33 the processor 15 adjusts the intensity of the light output from the backlight unit in response to the decrease in the output brightness of the display 13 calculated in the operation S32.

According to an embodiment, in the operation S33, the processor 15 may perform an operation of storing reference brightness in the storage 17, and an operation of adjusting the intensity of the light output from the backlight unit to correspond to the reference brightness when the output brightness of the display 13 calculated in the operation S32 is lower than the reference brightness.

As described above, according to the disclosure, it is possible to maintain constant brightness by making up for the decrease in the brightness of the display according to the use time. Further, it is possible to reduce costs because the brightness of the display is measured by one illuminance sensor without being affected by the external light.

Further, according to the disclosure, it is possible to determine whether content is normally reproduced on the display because the display's own brightness is measured.

Figure 4:
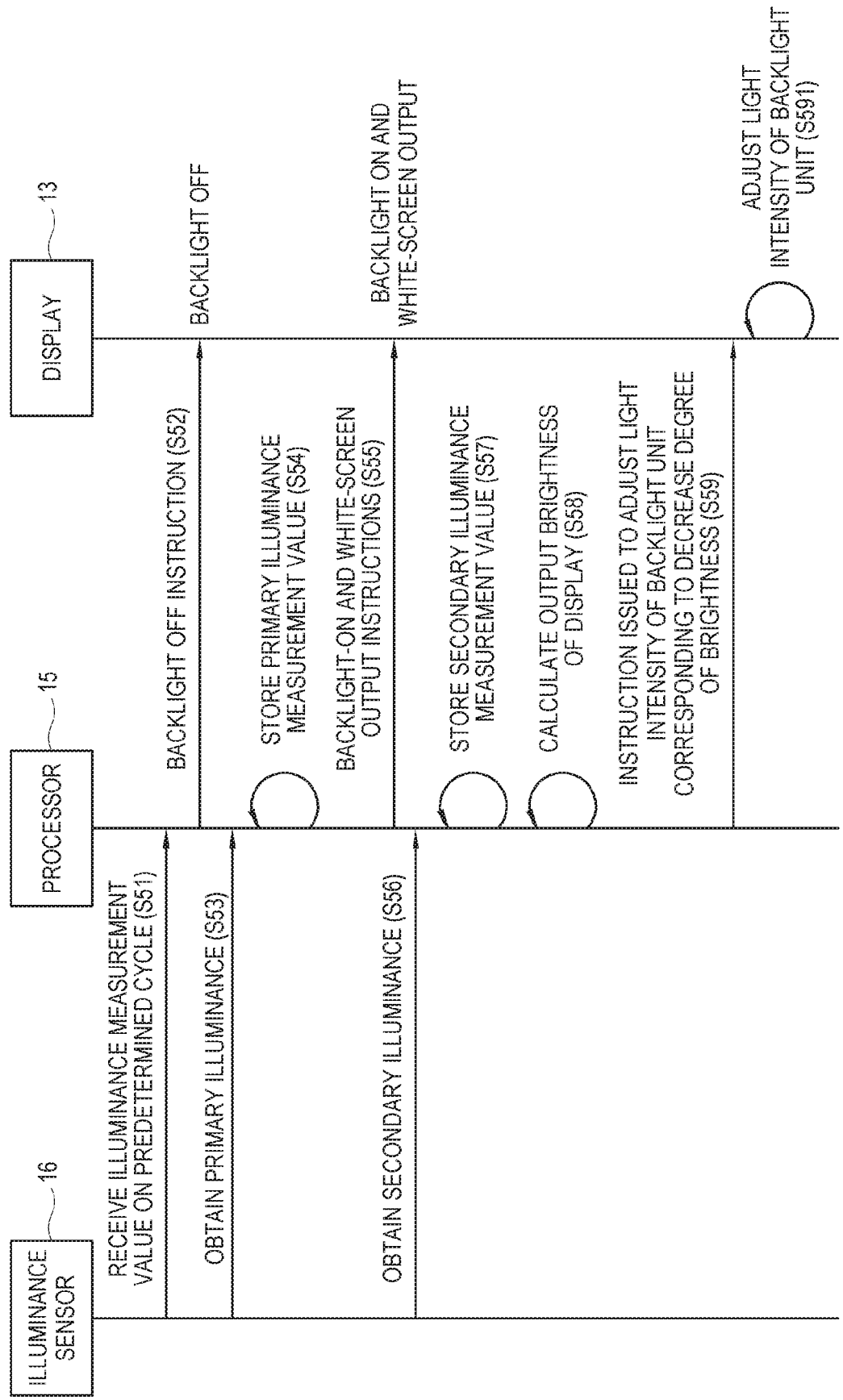
FIG. 4 illustrates an example showing flow of operations among an illuminance sensor, a processor, and a display according to an embodiment of the disclosure.

FIG. 4 illustrates an example showing flow of operations among an illuminance sensor, a processor, and a display according to an embodiment of the disclosure. The illustrated example shows flow of detailed operations among the display 13, the processor 15, and the illuminance sensor 16 of FIG. 2, and the flow of the operations among these elements is based on the operations of FIG. 3.

In the illustrated example, the flow of the operations between the illuminance sensor 16 and the processor 15 corresponds to the operation S31, and the flow of the operations between the processor 15 and the display 13 corresponds to the operation S32 and the operation S33.

The processor 15 receives an illuminance measurement value generated as sensed by the illuminance sensor 16 on a cycle (S51). In this case, the received illuminance measurement values may be stored in the storage 17.

Here, the cycle may for example be set based on a time slot such as every night at which external light has less influence According to an embodiment, the processor 15 may make a request for the illuminance measurement value to the illuminance sensor 16 on the cycle so as to receive the illuminance measurement value.

Next, the processor 15 transmits a backlight-off instruction to the display 13 (S52).

Thus, the processor 15 obtains primary illuminance based on the illuminance measurement value generated as sensed by the illuminance sensor 16 in the state that the backlight of the display 13 is turned off (S53).

In this case, the illuminance measurement value generated by the sensing of the illuminance sensor 16 is stored in the storage 17, and the processor 15 obtains the primary illuminance based on the illuminance measurement value stored at a point in time when the backlight unit is turned off.

The processor 15 controls the primary illuminance measurement value obtained as above to be stored in a buffer (S54).

Next, the processor 15 transmits backlight-on and white-screen output instructions to the display 13 (S55). Here, a white screen is based on settings to make the display 13 output a white color, which is an example of an output color settable to measure the output brightness of the display 13 under conditions that the influence of the external light is excluded.

Thus, the processor 15 obtains secondary illuminance based on the illuminance measurement value generated by the sensing of the illuminance sensor 15 under the conditions that the backlight of the display 13 is turned on and the white screen is output (S56).

In this case, the operation of the display 13 before obtaining the secondary illuminance, i.e. the output of the white screen is merely a design reference. Alternatively, the secondary illuminance may be obtained even under brightness other than the brightness of the white screen.

The processor 15 controls the secondary illuminance measurement value obtained as above to be stored in the buffer (S57).

The processor 15 calculates the output brightness of the display 13 based on the primary illuminance measurement value and the secondary illuminance measurement value stored in the buffer (S58).

Here, the primary illuminance measurement value refers to a value measured based on the brightness of only the external light 161 under the condition that the backlight unit is turned off, and the secondary illuminance measurement value refers to a value measured based on the brightness of both the external light 161 and the panel light 162 under the conditions that the backlight unit is turned on and the white screen is output.

Therefore, the processor 15 calculates the output brightness of the display 13 by subtracting the primary illuminance measurement value from the secondary illuminance measurement value in order to exclude the influence of the external light 161.

The processor 15 calculates the output brightness of the display 13 on a cycle as described above, and sends the display 13 an instruction issued to adjust the intensity of the light of the backlight unit according to the calculated decrease degree of the output brightness (S59). For example, the instruction may be issued to increase a current level of the backlight unit as much as the decrease in the output brightness, thereby increasing the intensity of the light.

Thus, when the light intensity of the backlight unit is adjusted in the display 13 (S591), the display 13 is compensated for the decrease in the brightness. In other words, the brightness is maintained constant regardless of the use time of the display 13.

Figure 5:
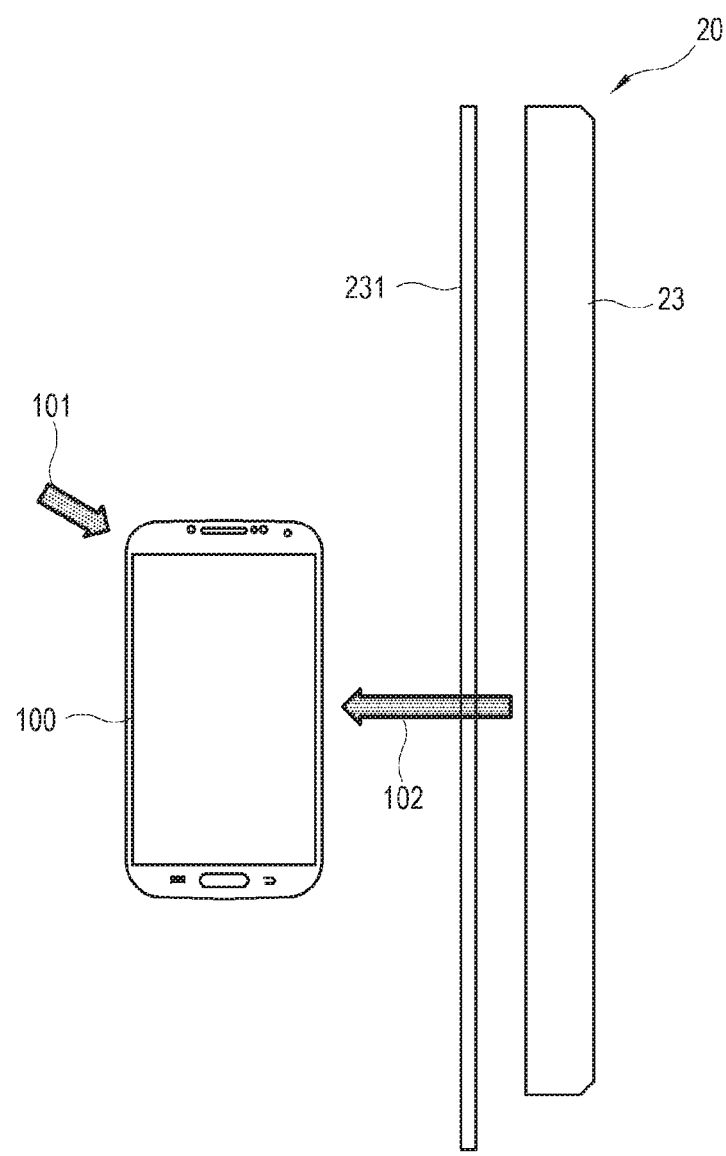
FIG. 5 illustrates an example of measuring illuminance by an external electronic device according to an embodiment of the disclosure.

FIG. 5 illustrates an example of measuring illuminance by an external electronic device according to an embodiment of the disclosure. On the contrary to the display apparatus 10 of FIG. 2 including the built-in illuminance sensor 16, the display apparatus 20 of FIG. 5 shows a case where an electronic device 100 is provided outside the display apparatus 20 and functions as the illuminance sensor. The electronic device 100 may include an illuminance sensor or a camera. As shown in FIG. 5, the display apparatus 20 according to an embodiment includes a display 23, and glass 231 provided on the front of the display 23, and wirelessly communicates with the external electronic device 100.

In this embodiment, the electronic device 100 may be, for example, a mobile device including the illuminance sensor or camera capable of measuring the illuminance in a space within a range.

The electronic device 100 is capable of sensing both external light 101 at a position close to the display apparatus 20 and panel light 102 emitted from the display 23 and passing through the glass 231, while using the illuminance sensor or the camera.

According to an embodiment, the display apparatus 20 calculates the output brightness of the display 23 based on the illuminance value measured by the external electronic device 100 in order to monitor whether the brightness of the display 23 is decreased according to use time.

The display apparatus 20 determines a decrease degree of the output brightness of the display 23 calculated as above, and performs an operation to make up for the determined decrease degree.

Figure 6:
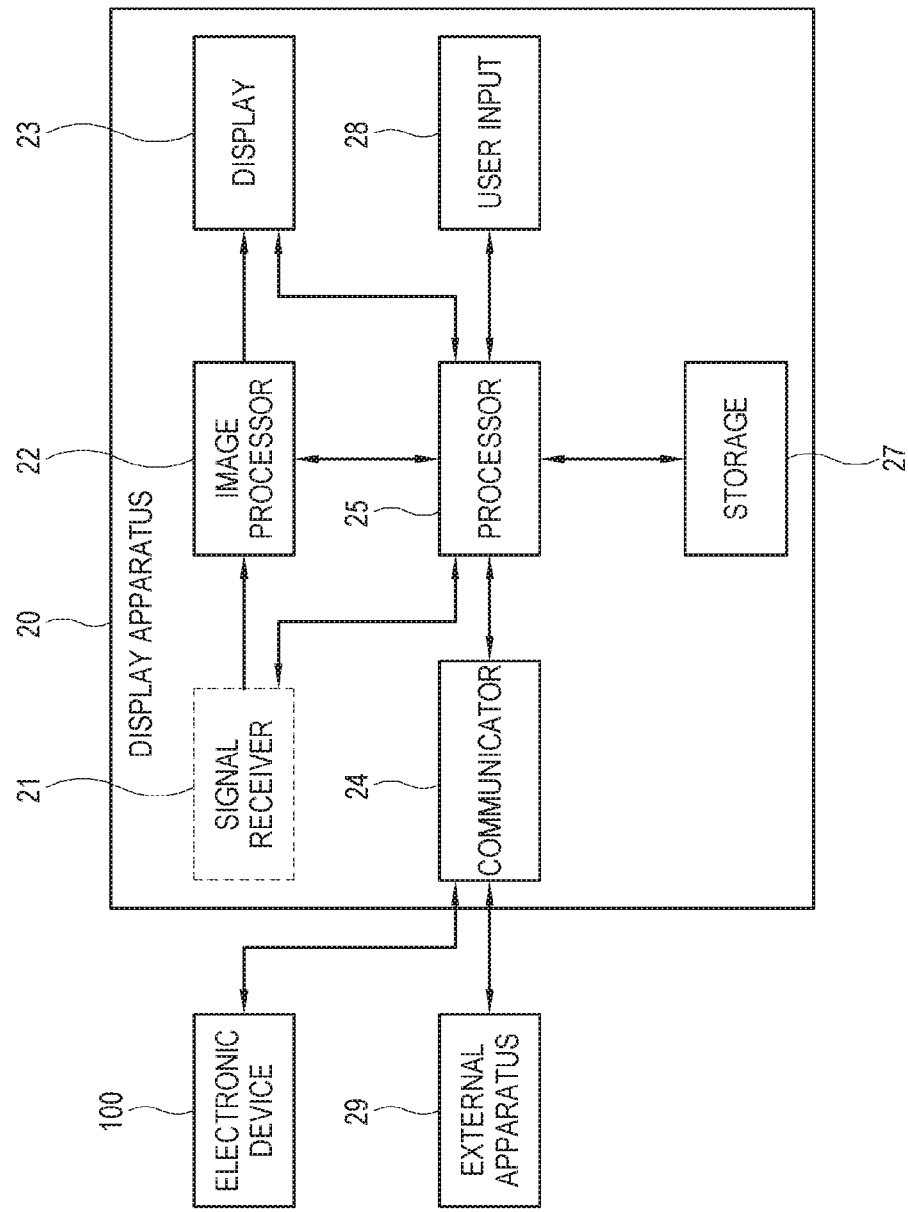
FIG. 6 is a block diagram showing a configuration of a display apparatus according to an embodiment of the disclosure.

FIG. 6 is a block diagram showing a configuration of a display apparatus according to an embodiment of the disclosure. As shown in FIG. 6, the display apparatus 20 according to an embodiment of the disclosure may include an image processor 22, a display 23, a communicator 24, a processor 25, a storage 27, and a user input 28, and may further include a signal receiver 21.

Among the elements of the display apparatus 20, the signal receiver 21, the image processor 22, the display 23, the communicator 24, the storage 27, and the user input 28 are equivalent to those of FIG. 2, and repetitive descriptions thereof will be avoided.

The display apparatus 20 communicates with an external apparatus 29 and the electronic device 100 through the communicator 24 by a wired or wireless communication method. The external apparatus 29 may be provided as a server that provides content, and the electronic device 100 may for example be provided as a mobile device, a tablet or the like capable of measuring the illuminance.

The electronic device 100 employs its own illuminance sensor or camera to sense both the external light 101 such as sunlight and the like at a position near to the display apparatus 20 and the panel light 102 emitted from the backlight unit of the display 23 and passing through the glass 231.

In this case, the illuminance sensor or the camera provided in the electronic device 100 may include a complementary metal oxide semiconductor (CMOS) or a charge coupled device (CCD), or may be configured with a lens capable of sensing the quantity of light.

Figure 7:
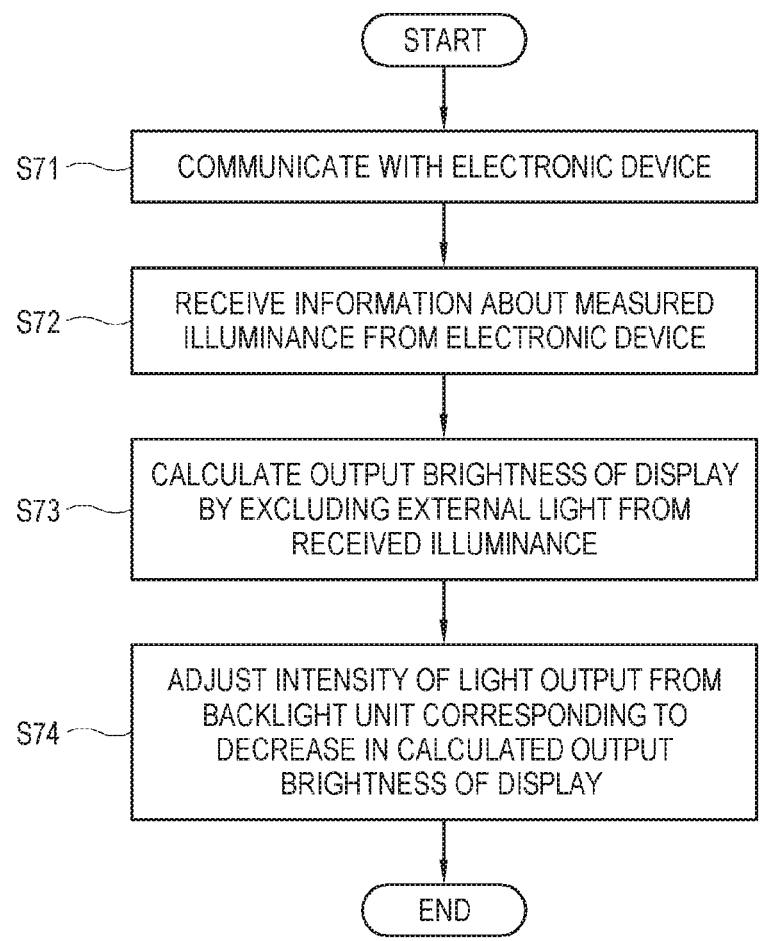
FIG. 7 is a flowchart showing a control method of a display apparatus according to an embodiment of the disclosure.

According to an embodiment of the disclosure, the operations of the processor 25 may be illustrated like the flowchart shown in FIG. 7.

First, at operation S71, the processor 25 communicates with the electronic device 100 through the communicator 24.

Next, at operation S72, the processor 25 receives information about illuminance from the electronic device 100. Here, the information about the illuminance may include an illuminance value obtained by sensing the external light 101 and the panel light 102.

Next, at operation S73, the processor 25 calculates the output brightness of the display 23 by excluding the component of the external light 101 from the illuminance received from the electronic device 100.

According to an embodiment, in the operation S73, the processor 25 may perform an operation of calculating the output brightness of the display 23 by receiving the illuminance value from the electronic device 100 on preset schedule, and an operation of monitoring a decrease degree of the calculated output brightness. Thus, it is possible to measure how much the brightness of the display 23 is decreased according to use time.

Last, at operation S74, the processor 25 adjusts the intensity of the light output from the backlight unit in response to the decrease in the calculated output brightness of the display 23.

According to an embodiment, in the operation S74, the processor 25 may perform an operation of storing reference brightness in the storage 27, and an operation of adjusting the intensity of the light output from the backlight unit to correspond to the reference brightness when the output brightness of the display 23 calculated in the operation S73 is lower than the reference brightness.

As described above, according to the disclosure, the illuminance sensor is not provided in the display apparatus, but it is possible to make up for the decrease degree of the brightness as the mobile device is used by a user to measure the brightness of the whenever necessary.

Figure 8:
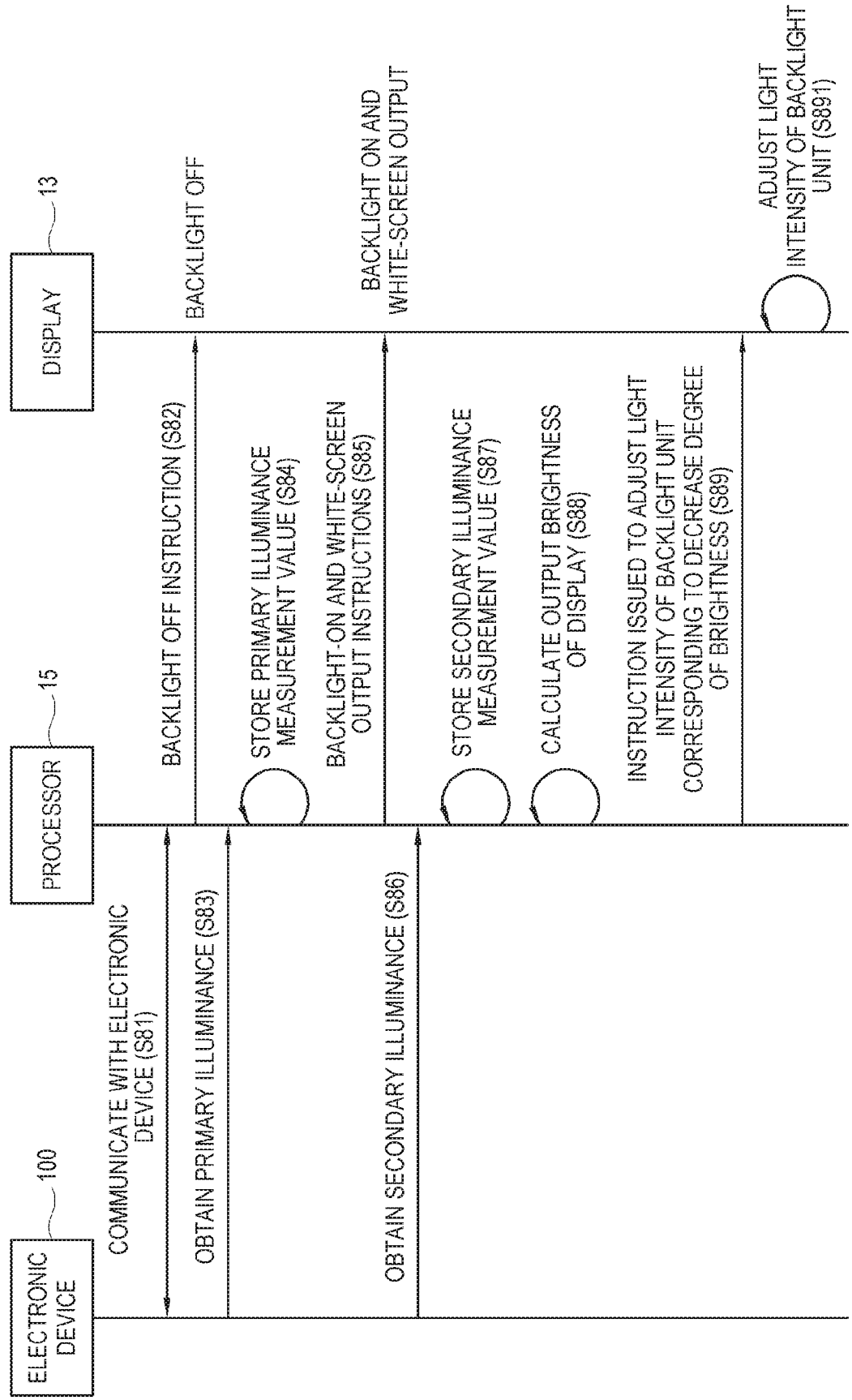
FIG. 8 illustrates an example showing flow of operations among an electronic device, a processor and a display according to an embodiment of the disclosure.

FIG. 8 illustrates an example showing flow of operations among an electronic device, a processor and a display according to an embodiment of the disclosure. The illustrated example shows flow of detailed operations among the display 23, the processor 25, and the electronic device 100 of FIG. 6, and the flow of the operations among these elements is based on the operations of FIG. 7.

In the illustrated example, the flow of the operations between the electronic device 100 and the processor 25 corresponds to the operation S71 and the operation S72, and the flow of the operations between the processor 25 and the display 23 corresponds to the operation S73 and the operation S74.

The processor 25 communicates with the electronic device 100 through the communicator 24 (S81). In this case, the processor 25 may communicate with the electronic device 100 by, for example, Bluetooth, Wi-Fi direct, or the like wireless communication method when the electronic device 100 comes within a range from the processor 25

Next, the processor 25 transmits a backlight-off instruction to the display 23 (S82).

Thus, the processor 25 obtains primary illuminance based on the illuminance measurement value generated as sensed or captured by the illuminance sensor or the camera of the electronic device 100 in the state that the backlight unit of the display 23 is turned off (S83).

The processor 25 controls the primary illuminance measurement value obtained as above to be stored in a buffer (S84).

Next, the processor 25 transmits backlight-on and whitescreen output instructions to the display 23 (S85).

Thus, the processor 25 obtains secondary illuminance based on the illuminance measurement value generated as sensed or captured by the illuminance sensor or the camera of the electronic device 100 under the conditions that the backlight unit of the display 23 is turned on and the white screen is output (S86).

The processor 25 controls the secondary illuminance measurement value obtained as above to be stored in the buffer (S87).

The processor 25 calculates the output brightness of the display 23 based on the primary illuminance measurement value and the secondary illuminance measurement value stored in the buffer (S88).

Here, the primary illuminance measurement value refers to a value measured based on the brightness of only the external light 101 under the condition that the backlight unit is turned off, and the secondary illuminance measurement value refers to a value measured based on the brightness of both the external light 101 and the panel light 102 under the conditions that the backlight unit is turned on and the white screen is output.

Therefore, the processor 25 calculates the output brightness of the display 23 by subtracting the primary illuminance measurement value from the secondary illuminance measurement value in order to exclude the influence of the external light 101.

The processor 25 calculates the output brightness of the display 23 on a cycle as described above, and sends the display 23 an instruction issued to adjust the intensity of the light of the backlight unit according to the calculated decrease degree of the output brightness (S89). For example, the instruction may be issued to increase a current level of the backlight unit as much as the decrease in the output brightness, thereby increasing the intensity of the light.

Thus, when the light intensity of the backlight unit is adjusted in the display 23 (S891), the display 23 is compensated for the decrease in the brightness according to the use time.

Figure 9:
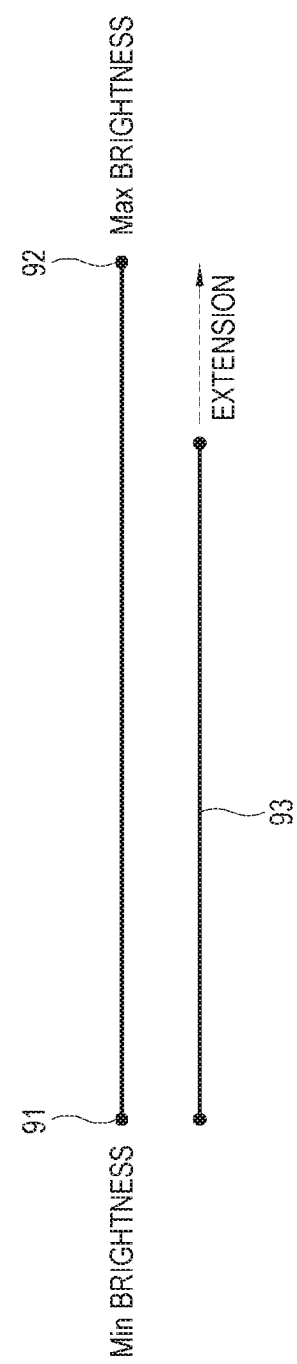
FIG. 9 illustrates an example showing an output brightness set range of a display according to an embodiment of the disclosure.

FIG. 9 illustrates an example showing an output brightness set range of a display according to an embodiment of the disclosure. The example illustrated in FIG. 9 is applicable in common to both the embodiment of FIG. 2 and the embodiment of FIG. 5, and is related to settings for the output brightness of the display 13. According to an embodiment of the disclosure, the processor 15 sets the output brightness of the display 13 to be within a range 93 having a first maximum value lower than a limit value 92 for the brightness that the backlight unit can output. In this case, the output brightness of the display 13 may be set as a default when the display apparatus 10 is manufactured or may be set based on a user's input.

The processor 15 may increase the set range for the output brightness from the first maximum value to a second maximum value in order to make up for the decrease in the brightness when the output brightness of the display 13 is decreased with a lapse of its use time.

That is, the set range for the output brightness of the display 13 may be gradually extended according to a decrease rate of the brightness.

Figure 10:
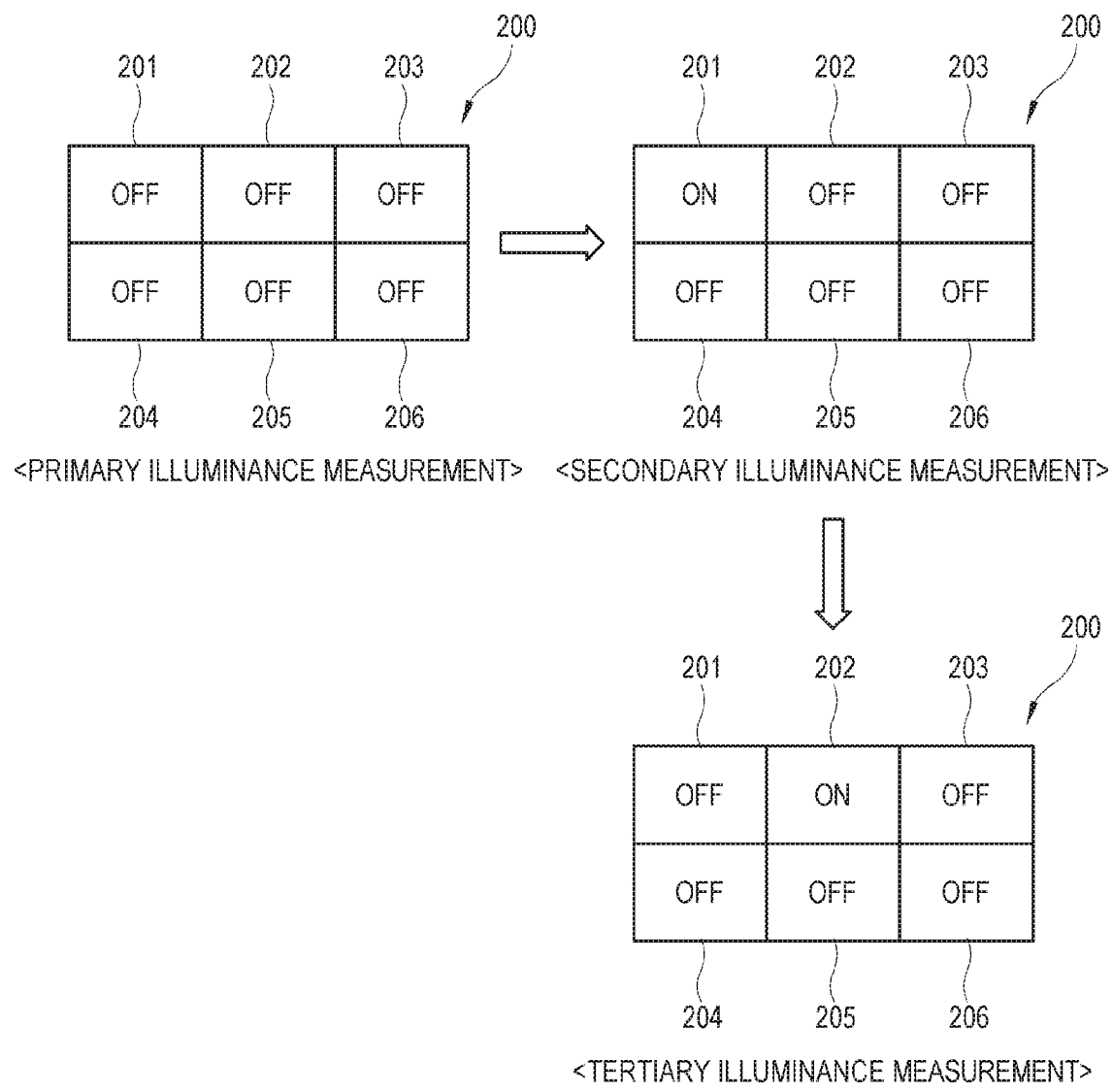
FIG. 10 illustrates an example showing a process of measuring illuminance of a plurality of display modules according to an embodiment of the disclosure.

FIG. 10 illustrates an example showing a process of measuring illuminance of a plurality of displays according to an embodiment of the disclosure. As shown therein, when a display apparatus 200 includes a plurality of displays 201, 202, 203, 204, 205 and 206, illuminance sensors may be provided corresponding to the displays 201, 202, 203, 204, 205 and 206, respectively.

According to an embodiment, in order to measure the output brightness of the plurality of displays 201, 202, 203, 204, 205 and 206, the processor 15 may turn off all the backlight units of the displays 201, 202, 203, 204, 205 and 206 and then measure the primary illuminance.

Next, the processor 15 may measure secondary illuminance by turning on a backlight unit of only a first display 201 under a condition that the backlight units of the plurality of displays 201, 202, 203, 204, 205 and 206 are all turned off.

In this case, the processor 15 may calculate the output brightness of the first display 201 based on the illuminance value obtained by subtracting the primary illuminance from the secondary illuminance measured as above in order to exclude the influence of the external light.

Next, the processor 15 may measure tertiary illuminance by turning on a backlight unit of only a second display 202 under a condition that all the backlight units of the plurality of displays 201, 202, 203, 204, 205 and 206 are turned off.

Likewise, the processor 15 may calculate the output brightness of the second display 202 based on the illuminance value obtained by subtracting the primary illuminance from the tertiary illuminance.

In such a manner, each output brightness of the plurality of displays 201, 202, 203, 204, 205 and 206 is calculated in sequence, thereby determining a decrease degree in brightness of each individual display.

Thus, each individual display is compensated for decrease in brightness by adjusting the light intensity of the backlight unit with regard to the display, of which the decrease degree of the brightness is higher than a threshold, among the plurality of displays 201, 202, 203, 204, 205 and 206.

According to an embodiment, the processor 15 controls the reference brightness to be stored for all the plurality of displays, and controls the display, of which the output brightness measured by each individual illuminance sensor is not higher than the reference brightness, to be compensated for the brightness.

As described above, according to the disclosure, a display is compensated for decrease in brightness caused by use time, thereby maintaining constant brightness.

Further, according to the disclosure, one illuminance sensor is enough to measure the brightness of the display without being affected by external light, thereby reducing costs.

Further, according to the disclosure, the display's own brightness is measured to thereby monitor whether content is normally reproduced on the display.

Although the disclosure has been described in detail through the foregoing embodiments, the disclosure may be variously embodied within the scope defined in the appended claims without limitations.

What is claimed is:

1. A display apparatus comprising:
    a display comprising a liquid crystal layer, and a backlight unit configured to output light toward the liquid crystal layer;
    an illuminance sensor provided in a direction in which the light passes through the liquid crystal layer; and
    a processor configured to control the illuminance sensor to measure first illuminance of the light passing through the liquid crystal layer based on the backlight unit being turned on and second illuminance based on the backlight unit being turned off, identify output brightness of the display based on a difference between the first illuminance and the second illuminance, and adjust intensity of light output from the backlight unit to correspond to the difference.

2. The display apparatus according to claim 1, further comprising glass provided on a front of the display,
    wherein the processor identifies the output brightness of the display by excluding external light coming through the glass from the measured first illuminance and the measured second illuminance.

3. The display apparatus according to claim 2, wherein the illuminance sensor is provided to have a sensing direction oriented toward a space between the glass and the display.

4. The display apparatus according to claim 3, wherein the sensing direction of the illuminance sensor is changeable.

5. The display apparatus according to claim 1, wherein the processor identifies the output brightness of the display on a preset cycle, and monitors a decrease of the identified output brightness.

6. The display apparatus according to claim 1, further comprising a storage,
    wherein the processor controls the storage to store reference brightness, and adjusts intensity of light output from the backlight unit to correspond to the reference brightness based on the identified output brightness being lower than the reference brightness.

7. The display apparatus according to claim 1, wherein the processor controls the illuminance sensor to measure the first illuminance based on a white screen being output.

8. The display apparatus according to claim 1, wherein the illuminance sensor is placed in a bezel region of the display apparatus.

9. The display apparatus according to claim 1, wherein the processor controls the display to operate with a first maximum value lower than a limit value for the output brightness of the backlight unit, and to increase the output brightness from the first maximum value to a second maximum value based on the output brightness being decreased.

10. A display apparatus comprising:
    a display comprising a liquid crystal layer, and a backlight unit configured to output light toward the liquid crystal layer;
    a communicator configured to communicate with an electronic device provided in a direction in which the light passes through the liquid crystal layer; and
    a processor configured to control the communicator to receive information about first illuminance of the light passing through the liquid crystal layer measured based on the backlight unit being turned off and second illuminance based on the backlight unit being turned on from the electronic device, identify output brightness of the display based on a difference between the first illuminance and the second illuminance, and adjust intensity of light output from the backlight unit to correspond to the difference.

11. The display apparatus according to claim 10, wherein the processor controls the communicator to receive the information from the electronic device including an illuminance sensor or a camera to measure illuminance.

12. A computer program product comprising:
    a memory configured to store a plurality of instructions; and
    a processor,
    wherein the instruction is executed by the processor to control an illuminance sensor provided in a direction in which light passes through a liquid crystal layer to measure first illuminance of the light passing through the liquid crystal layer based on a backlight unit being turned on and second illuminance based on the backlight unit being turned off, identify output brightness of a display based on a difference between the first illuminance and the second illuminance, and adjust intensity of light output from the backlight unit to correspond to the difference.

13. A method of controlling a display apparatus comprising a display comprising a liquid crystal layer and a backlight unit configured to output light toward the liquid crystal layer, and an illuminance sensor, the method comprising:
    measuring, by the illuminance sensor provided in a direction in which the light passes through the liquid crystal layer, first illuminance of the light passing through the liquid crystal layer based on the backlight unit being turned on and second illuminance based on the backlight unit being turned off;
    identifying output brightness of the display based on a difference between the first illuminance and the second illuminance; and adjusting intensity of light output from the backlight unit to correspond to the difference.

14. The method according to claim 13, wherein the identifying the output brightness comprises identifying the output brightness of the display by excluding external light coming through glass provided on a front of the display from the measured first illuminance and the measured second illuminance.

15. The method according to claim 14, wherein the illuminance sensor is provided to have a sensing direction oriented toward a space between the glass and the display.

16. The method according to claim 13, wherein the identifying the output brightness comprises:
 identifying the output brightness of the display on a preset cycle; and
 monitoring a decrease of the identified output brightness.

17. The method according to claim 13, further comprising:
 storing reference brightness; and
 adjusting intensity of light output from the backlight unit to correspond to the reference brightness based on the identified output brightness being lower than the reference brightness.

18. The method according to claim 13, wherein the measuring first illuminance comprises measuring the first illuminance based on the output brightness of the display based on a white screen being output.

19. A method of controlling a display apparatus comprising a display comprising a liquid crystal layer and a backlight unit configured to output light toward the liquid crystal layer, and a communicator configured to communicate with an electronic device, the method comprising:
 receiving information about first illuminance of the light passing through the liquid crystal layer measured based on the backlight unit being turned off and second illuminance measured based on the backlight unit being turned on from the electronic device provided in a direction in which the light passes through the liquid crystal layer;
 identifying output brightness of the display based on a difference between the first illuminance and the second illuminance; and
 adjusting intensity of light output from the backlight unit to correspond to the difference.

20. The method according to claim 19, wherein the receiving information comprises receiving the information from the electronic device including an illuminance sensor or a camera to measure illuminance.

\* \* \* \* \*